United States Patent
Kumar et al.

(10) Patent No.: US 11,053,446 B2
(45) Date of Patent: Jul. 6, 2021

(54) PROCESS FOR REDUCING TOTAL ACID NUMBER OF HEAT TRANSFER FLUID

(71) Applicant: RELIANCE INDUSTRIES LIMITED, Maharashtra (IN)

(72) Inventors: Prakash Kumar, Vadodara (IN); Satish Kumar, Haryana (IN); Sunil Agrahari, Nagar (IN); Sunil Peter, Kannur District (IN); Kalpana Gopalakrishnan, Vadodara (IN); Rajeev Kumar Gupta, Surat (IN); Viral B. Desai, Baroda (IN); Tarun Singla, Sangrur (IN); Dinesh Kakkar, Firozpur (IN); Pankaj Upadhyay, Katni (IN); Piyush Vyas, Ujjain (IN); Raksh Vir Jasra, Vadodara (IN)

(73) Assignee: RELIANCE INDUSTRIES LIMITED, Mumbai (IN)

( * ) Notice: Subject to any disclaimer, the term of this patent is extended or adjusted under 35 U.S.C. 154(b) by 0 days.

(21) Appl. No.: 16/615,114

(22) PCT Filed: May 18, 2018

(86) PCT No.: PCT/IB2018/053515
§ 371 (c)(1),
(2) Date: Nov. 19, 2019

(87) PCT Pub. No.: WO2018/211467
PCT Pub. Date: Nov. 22, 2018

(65) Prior Publication Data
US 2020/0157437 A1   May 21, 2020

(30) Foreign Application Priority Data
May 19, 2017  (IN) .............................. 201721017606

(51) Int. Cl.
C10G 25/00  (2006.01)
B01J 20/08  (2006.01)
C09K 5/10  (2006.01)

(52) U.S. Cl.
CPC ............ *C10G 25/003* (2013.01); *B01J 20/08* (2013.01); *C09K 5/10* (2013.01); *C10G 25/006* (2013.01); *C10G 2300/1007* (2013.01); *C10G 2300/202* (2013.01); *C10G 2300/207* (2013.01); *C10G 2300/30* (2013.01); *C10G 2300/302* (2013.01)

(58) Field of Classification Search
CPC ................ C10G 25/003; C10G 25/006; C10G 2300/1007; C10G 2300/202; C10G 2300/207; C10G 2300/30; C10G 2300/302; C10G 31/00; C10G 25/02; B01J 20/08; C09K 5/10
USPC .......................................................... 252/67
See application file for complete search history.

(56) References Cited

U.S. PATENT DOCUMENTS

| | | | |
|---|---|---|---|
| 8,519,204 B2 * | 8/2013 | Ohler ........................ | C07C 5/03 585/240 |
| 8,815,085 B2 | 8/2014 | Husain et al. | |
| 2011/0133121 A1 * | 6/2011 | Shinohata ............. | C07C 271/54 252/182.12 |
| 2012/0256120 A1 * | 10/2012 | Bouvier ........... | C10M 175/0091 252/68 |
| 2013/0037448 A1 | 2/2013 | Al-Hajji et al. | |
| 2013/0310617 A1 * | 11/2013 | Ohler ........................ | C07C 5/03 585/277 |
| 2019/0085224 A1 * | 3/2019 | Sethi ....................... | C09K 5/045 |
| 2019/0177589 A1 * | 6/2019 | Sethi ....................... | C09K 5/045 |
| 2019/0233698 A1 * | 8/2019 | Yana Motta ....... | C10M 171/008 |
| 2020/0164340 A1 * | 5/2020 | Kumar ................... | B01J 20/041 |

* cited by examiner

*Primary Examiner* — Douglas J McGinty
(74) *Attorney, Agent, or Firm* — Fish IP Law, LLP

(57) ABSTRACT

The present disclosure relates to a process to reduce total acid number (TAN) of a heat transfer fluid. The process comprises contacting the heat transfer fluid with an adsorbent composition at a temperature in the range of 50° C. to 350° C. and a pressure in the range of 1 bar to 10 bar to obtain a treated heat transfer fluid having total acid number (TAN) in the range of 0.003 to 0.03 and pH in the range of 6 to 7.5, wherein the adsorbent composition is provided in a fixed bed and the heat transfer fluid is passed through the fixed bed comprising the adsorbent composition at a liquid hourly space velocity (LHSV) in the range of 0.5 per hour to 10 per hour.

9 Claims, 2 Drawing Sheets

PROCESS FOR REDUCING TOTAL ACID NUMBER OF HEAT TRANSFER FLUID

FIELD

The present disclosure relates to a process for reducing total acid number of a heat transfer fluid.

DEFINITIONS

As used in the present disclosure, the following terms are generally intended to have the meaning as set forth below, except to the extent that the context in which they are used to indicate otherwise.

Total acid number (TAN) refers to a measurement of acidity which is determined by the amount of potassium hydroxide in milligrams that is needed to neutralize the acids in one gram of oil.

Chemisorption refers to adsorption method wherein the adsorbed material(s) is/are held by chemical bonds.

BACKGROUND

Heat transfer fluid is used for a wide range of indirect heat transfer applications operating at a temperature in the range of 15° C. to 400° C. and at a pressure in the range of 1 bar to 10.6 bar.

However, as a result of failure of process equipment during working of a process, contaminants from the process equipment can be transferred or introduced into the heat transfer fluid. These contaminants, specifically acidic contaminants increase acidity i.e. total acid number (TAN) of the heat transfer fluid. Increase acidity (TAN) of the heat transfer fluid further leads to corrosion of the process equipment. Due to the fouling and corrosion, efficiency of the heat transfer fluid is reduced. It is therefore necessary to remove acidic contaminants from the heat transfer fluid.

Conventionally, acidic contaminants can be removed from the heat transfer fluid by distillation. However, acidic contaminants having similar boiling points as that of the heat transfer fluid cannot be removed by distillation. Further, acidic contaminants can be removed by alkali wash. However, in this process, removal of traces of moisture from the heat transfer fluid is tedious and a substantial amount of heat transfer fluid is lost.

There is, therefore, felt a need for an alternative to reduce the total acid number (TAN) of heat transfer fluids that overcomes the above mentioned drawbacks.

OBJECTS

Some of the objects of the present disclosure, which at least one embodiment herein satisfies, are as follows.

It is an object of the present disclosure to ameliorate one or more problems of the prior art or to at least provide a useful alternative.

An object of the present disclosure is to provide a process to reduce the total acid number (TAN) of the heat transfer fluid.

Another object of the present disclosure is to provide an eco-friendly and an economical process to reduce the total acid number (TAN) of the heat transfer fluid.

Other objects and advantages of the present disclosure will be more apparent from the following description, which is not intended to limit the scope of the present disclosure.

SUMMARY

The present disclosure provides a process to reduce total acid number (TAN) of a heat transfer fluid.

The process comprises contacting the heat transfer fluid with an adsorbent composition at a temperature in the range of 50° C. to 350° C. and a pressure in the range of 1 bar to 10 bar to obtain a treated heat transfer fluid having total acid number (TAN) in the range of 0.003 to 0.03 and pH in the range of 6 to 7.5, wherein the adsorbent composition is provided in a fixed bed and the heat transfer fluid is passed through the fixed bed comprising the adsorbent composition at a predetermined liquid hourly space velocity (LHSV), at a predetermined temperature and at a predetermined pressure.

The adsorbent composition used for reducing the total acid number (TAN) comprises a layered double hydroxide in an amount in the range of 15 to 70 wt % of the total mass of the composition; alumina in an amount in the range of 30 to 85 wt % of the total mass of the composition; and optionally activated bauxite in an amount in the range of 15 to 50 wt % of the total mass of the composition.

BRIEF DESCRIPTION OF THE ACCOMPANYING DRAWING

The present disclosure will now be described with the help of the accompanying drawing, in which.

DETAILED DESCRIPTION

Figure 1:
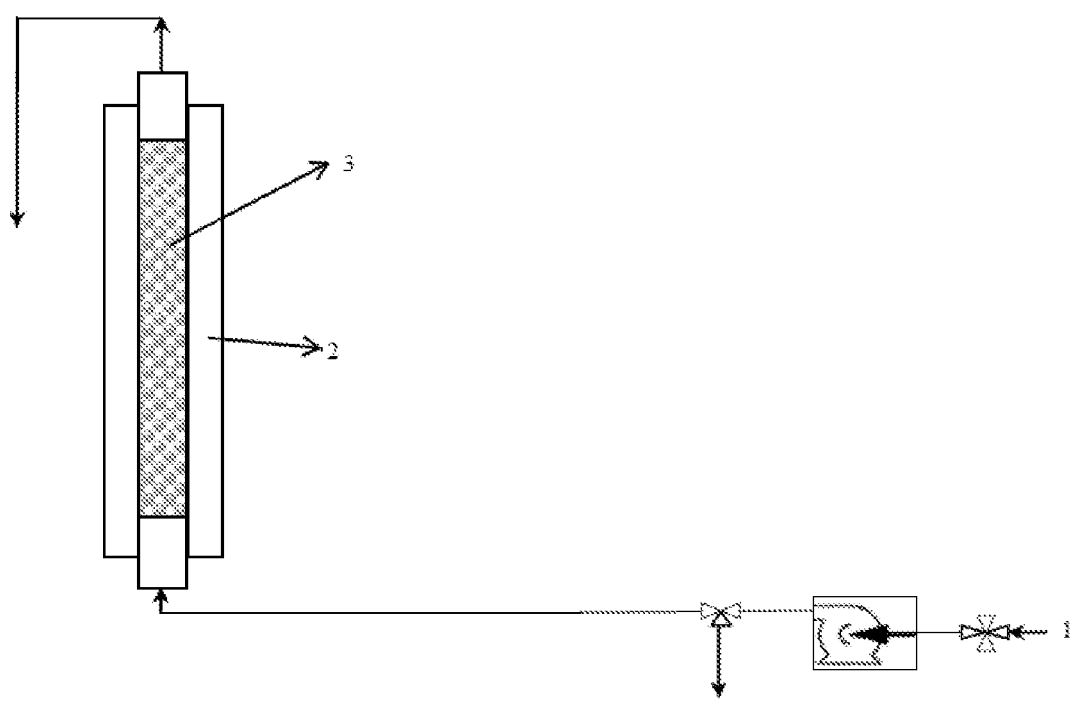
FIG. 1 illustrates a schematic representation of a process for reducing total acid number of heat transfer fluid.

Heat transfer fluids, are used for multifarious applications. However, consequent to failure of process equipment during working of a process, chemicals from the process equipment can be introduced into the high temperature operating heat transfer fluids. These contaminants, specifically acidic contaminants increase the acidity of fluids, resulting in corrosion of the process equipment. Therefore, it is necessary to remove acidic contaminants from heat transfer fluids so as to improve efficiency of heat transfer fluids. However, the conventional methods to reduce acidity (total acid number) of heat transfer fluids are associated with drawbacks such as expense, loss of fluids and formation of hazardous waste.

The present disclosure, therefore, envisages an economical and environment friendly process that reduces the total acid number (TAN) of the heat transfer fluid.

The process of the present disclosure for reducing the total acid number of the heat transfer fluid comprises the step of contacting the heat transfer fluid with an adsorbent composition to obtain a treated heat transfer fluid. The treated heat transfer fluid is characterized by total acid number (TAN) in the range of 0.003 to 0.03 and pH in the range of 6 to 7.5, wherein the adsorbent composition is provided in a fixed bed and the heat transfer fluid is passed through the fixed bed comprising the adsorbent composition at a predetermined liquid hourly space velocity (LHSV), at a predetermined temperature and at a predetermined pressure.

In accordance with the process of the present disclosure, the heat transfer fluid can be a single fluid or a mixture of heat transfer fluids.

In accordance with the process of the present disclosure, the predetermined temperature is in the range of 50° C. to 350° C. Typically, the predetermined temperature is in the range of 100° C. to 250° C.

In accordance with the process of the present disclosure, the predetermined pressure is in the range of 1 bar to 10 bar. Typically, the predetermined pressure is in the range of 1 bar to 5 bar.

In accordance with the process of the present disclosure, the predetermined liquid hourly space velocity (LHSV) is in the range of 0.5 per hour to 10 per hour. Typically, the predetermined liquid hourly space velocity (LHSV) is in the range of 1 per hour to 5 per hour.

Typically, the adsorbent composition of the present disclosure comprises a layered double hydroxide in an amount in the range of 15 to 70 wt % of the total mass of the composition; alumina in an amount in the range of 30 to 85 wt % of the total mass of the composition; and optionally, activated bauxite in an amount in the range of 15 to 50 wt % of the total mass of the composition.

Typically, the weight ratio of the heat transfer fluid to the adsorbent composition is in the range of 5:1 to 30:1. Typically, the weight ratio of the heat transfer fluid to the adsorbent composition is in the range of 10:1 to 20:1

Typically, the layered double hydroxide of the present disclosure is hydritalcite.

Typically, alumina of the present disclosure is selected from gamma alumina and pseudoboehmite.

Acidic contaminants in the heat transfer fluid increase it's acidity i.e. total acid number, which in turn reduce the pH (pH below 4). Due to the acidic nature of the heat transfer fluid, equipment where heat transfer fluid is used faces high risk of corrosion. The Adsorbent composition of the present disclosure is capable of efficiently removing acidic contaminants from heat transfer fluid, thereby increasing the pH of the heat transfer fluid in the range of 6 to 7.5, i.e., reducing the total acid number of the heat transfer fluid. The adsorbent composition of the present disclosure removes the acidic contaminants by chemisorption.

The adsorbent composition of the present disclosure can be introduced in the heat transfer fluid without interrupting or discontinuing the continuous process.

FIG. 1 discloses the process apparatus for removal of contaminants from heat transfer fluid. Typically, the assembly used in the process for the reducing total acid number (TAN) comprises a fixed bed column loaded with adsorbent composition (3) and an electric heater furnace (2). Contaminated heat transfer fluid (1) is passed through the fixed bed column to obtain a treated heat transfer fluid.

Figure 2:
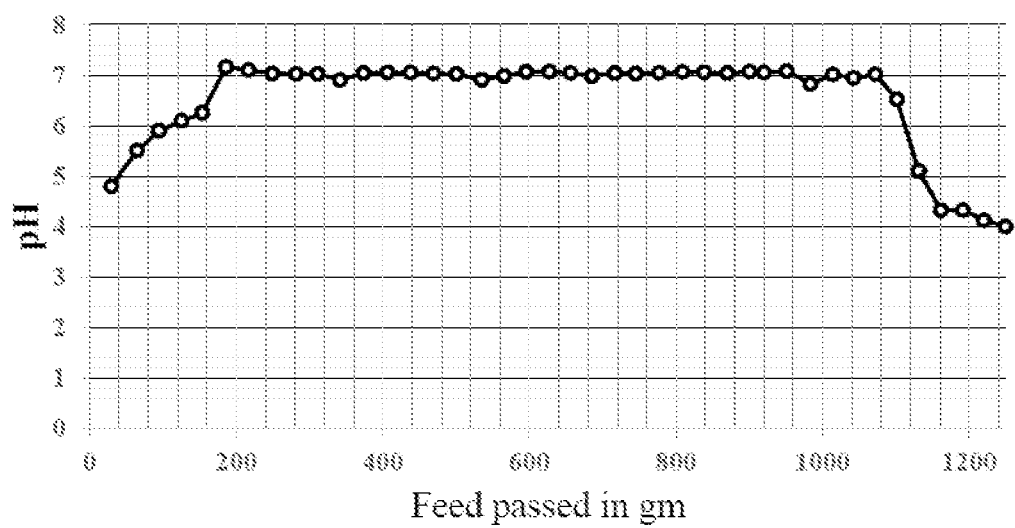
FIG. 2 illustrates a graphical representation of the adsorption capacity of the process of the present disclosure per 20 gms of the adsorbent composition.

FIG. 2 discloses efficiency of the process of the present disclosure. It can be inferred from FIG. 2 that even a lower amount of the adsorbent composition such as 20 gm can effectively reduce the TAN of the heat transfer fluid in an amount in the range of 200 gm to 2000 gm.

The process of the present disclosure employs an economical adsorbent composition capable of removing more than 90% of acidic contaminants from the contaminated heat transfer fluid. The process of the present disclosure removes acidic contaminants by chemisorption, thereby avoiding formation of hazardous waste. The adsorbent composition of the present disclosure can be recycled, thereby making the process economical in the long run.

The present disclosure is further illustrated herein below with the help of the following laboratory experiments. The experiments used herein are intended merely to facilitate an understanding of the ways in which the embodiments herein may be practiced and to further enable persons skilled in the art to practice the embodiments. Accordingly, the experiments should not be construed as limiting the scope of the embodiments herein. These experiments can be scaled up to a commercial scale.

EXPERIMENTAL DETAILS

General Procedure:

A contaminated heat transfer fluid is passed through a fixed bed of adsorbent composition at room temperature, liquid hourly space velocity (LHSV) of 1.5 $h^{-1}$, and atmospheric pressure. After the treatment, the heat transfer fluid with increased pH, reduced total acid number (TAN) with negligible amount of moisture was obtained.

Experiments 1-5: Effect of the Ratio of Fluid to Adsorbent Composition

Experiments 1-5 were carried out by following the procedure disclosed herein above. The ratio of fluid to adsorbent composition was varied. The results are tabulated in Table 1.

TABLE 1

Effect of the ratio of heat transfer fluid (Liquid) to adsorbent composition (Solid) on pH of the treated heat transfer fluid.

| Experiments | 1 | 2 | 3 | 4 | 5 |
|---|---|---|---|---|---|
| L/S ratio* | 100 | 50 | 20 | 10 | 5 |
| pH | 4.5 | 5.0 | 7.0 | 7.0 | 7.8 |

*Ratio of heat transfer fluid (Liquid) to adsorbent quantity (Solid)

In experiments 1 and 2, the ratio of heat transfer fluid to adsorbent quantity was 100 and 50 respectively and pH of the treated heat transfer fluid obtained was 4.5 and 5.0. It was therefore observed that pH of the treated heat transfer fluid remains acidic, if concentration of the adsorbent composition used in the process is very low.

In experiments 3 and 4, the ratio of heat transfer fluid to adsorbent composition was 20 and 10 respectively and pH of the treated heat transfer fluid obtained was 7.0. It was therefore observed that optimum concentration of the adsorbent composition neutralizes the heat transfer fluid, which is favourable for increasing efficiency of the heat transfer fluid.

In experiment 5, the ratio of heat transfer fluid to adsorbent quantity was 5 and pH of the treated heat transfer fluid obtained was 7.8. It was therefore observed that pH of the treated heat transfer fluid increase to basic, if concentration of the adsorbent composition is high.

Similar experiments 6 and 7 were carried out at higher scales of 10 kg and 150000 kg respectively at the temperature of 150° C. and 125° C. respectively.

Experiment 6:

A contaminated heat transfer fluid (10 kg) having a pH value of 3.9, total acid number of 0.07 and moisture content of 0.3 wt % was passed through a fixed bed of 1 kg of adsorbent composition (fluid to adsorbent ratio of 10) at 150° C., liquid hourly space velocity (LHSV) of 1.5 $h^{-1}$, and a pressure of 2 bar. After the treatment, the heat transfer fluid with pH 7, total acid number (TAN) of 0.01, and a negligible amount of moisture was obtained.

Experiment 7:

A contaminated heat transfer fluid (150000 kg) having a pH value of 4.3, total acid number of 0.06, and moisture content of 0.26 wt % moisture was passed through a fixed bed of 2500 kg of adsorbent composition (fluid to adsorbent ratio of 60) at 125° C., liquid hourly space velocity (LHSV) of 1 $h^{-1}$, and a pressure of 2 bar. After the treatment, the heat transfer fluid with a pH value of 6.5, total acid number of 0.01 and a negligible amount of moisture was obtained.

Experiment 8:

A contaminated heat transfer fluid (10.2 kg) having a pH value of 3.9, total acid number of 0.12 and moisture content of 500 ppm was passed through a fixed bed of 0.017 kg of adsorbent composition at 250° C., liquid hourly space velocity (LHSV) of 5 h$^{-1}$, and a pressure of 1 bar. After the treatment, the heat transfer fluid with pH 7, total acid number (TAN) of 0.01, and 200 ppm moisture was obtained.

Different physicochemical properties of the treated heat transfer fluid are tabulated in Table-2 given below.

Experiment 9:

A contaminated heat transfer fluid (5 kg) having a pH value of 3.9, total acid number of 0.12 and moisture content of 500 ppm was passed through a fixed bed of 0.042 kg of adsorbent composition at 150° C., liquid hourly space velocity (LHSV) of 5 h$^{-1}$, and a pressure of 1 bar. After the treatment, the heat transfer fluid with pH 7, total acid number (TAN) of 0.01, and 300 ppm moisture was obtained.

Different physicochemical properties of the treated heat transfer fluid are tabulated in Table-2 given below.

TABLE 2

| Properties | Pure heat transfer fluid (Dowtherm A) (Normal values) | Impure heat transfer fluid (Dowtherm A) | Heat transfer fluid (Dowtherm A) treated with the Adsorbent composition in experiment 8 | Heat transfer fluid (Dowtherm A) treated with the Adsorbent composition in experiment 9 |
|---|---|---|---|---|
| Kinematic Viscosity at 100° F. (cSt) | 2.5-3.4 | 2.52 | 2.5 | 2.6 |
| Total Acid Number, (mg KOH/g) | 0.0-0.03 | 0.12 | 0.01 | 0.01 |
| Moisture, ppm | 0-360 | 500 | 200 | 300 |
| Acetone Insoluble Solids, (mg/100 g) | 0-50 | 5.60 | 1.2 | 1.2 |
| Low Boilers (%) | 0 | 0.05 | 0 | ND |
| High Boilers plus Unaccountable (%) | 0 | 0.45 | 0.05 | 0.06 |

From Table-2, it is observed that compared to the impure heat transfer fluid, the physicochemical properties of the treated heat transfer fluid are improved.

Technical Advancements

The present disclosure described herein above has several technical advantages including, but not limited to, the process for reducing total acid number of heat transfer fluid that:

can remove more than 90% of contaminants, particularly acidic contaminants from the heat transfer fluid, so as to obviate fouling and corrosion issues and improve the life cycle of process equipment;

is economical; and is environment friendly.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the invention to achieve one or more of the desired objects or results. While certain embodiments of the inventions have been described, these embodiments have been presented by way of example only, and are not intended to limit the scope of the inventions. Variations or modifications to the formulation of this invention, within the scope of the invention, may occur to those skilled in the art upon reviewing the disclosure herein. Such variations or modifications are well within the spirit of this invention.

The numerical values given for various physical parameters, dimensions and quantities are only approximate values and it is envisaged that the values higher than the numerical value assigned to the physical parameters, dimensions and quantities fall within the scope of the invention unless there is a statement in the specification to the contrary.

While considerable emphasis has been placed herein on the specific features of the preferred embodiment, it will be appreciated that many additional features can be added and that many changes can be made in the preferred embodiment without departing from the principles of the disclosure. These and other changes in the preferred embodiment of the disclosure will be apparent to those skilled in the art from the disclosure herein, whereby it is to be distinctly understood that the foregoing descriptive matter is to be interpreted merely as illustrative of the disclosure and not as a limitation.

The invention claimed is:

1. A process for reducing total acid number of heat transfer fluid, the process comprising step of contacting said heat transfer fluid with an adsorbent composition to obtain a treated heat transfer fluid having total acid number (TAN) in the range of 0.003 to 0.03 mg KOH/g and pH in the range of 6 to 7.5;

wherein said adsorbent composition is provided in a fixed bed and said heat transfer fluid is passed through said fixed bed at a predetermined liquid hourly space velocity (LHSV), at a predetermined temperature and at a predetermined pressure; wherein said adsorbent composition comprises;

a layered double hydroxide in an amount in the range of 15 to 70 wt % of the total mass of the composition;

alumina in an amount in the range of 30 to 85 wt % of the total mass of the composition; and optionally, activated bauxite in an amount in the range of 15 to 50 wt % of the total mass of the composition.

2. The process as claimed in claim 1, wherein said predetermined liquid hourly space velocity (LHSV) is in the range of 0.5 per hour to 10 per hour.

3. The process as claimed in claim 1, wherein said predetermined liquid hourly space velocity (LHSV) is in the range of 1 per hour to 5 per hour.

4. The process as claimed in claim 1, wherein said predetermined temperature is in the range of 50° C. to 350° C.

5. The process as claimed in claim 1, wherein said predetermined temperature is in the range of 100° C. to 250° C.

6. The process as claimed in claim 1, wherein said predetermined pressure is in the range of 1 bar to 10 bar.

7. The process as claimed in claim 1, wherein said predetermined pressure is in the range of 1 bar to 5 bar.

8. The process as claimed in claim 1, wherein the weight ratio of the heat transfer fluid to the adsorbent composition is in the range of 5:1 to 30:1.

9. The process as claimed in claim 1, wherein the weight ratio of the heat transfer fluid to the adsorbent composition is in the range of 10:1 to 20:1.

* * * * *